United States Patent [19]

Boyer et al.

[11] Patent Number: 4,633,964

[45] Date of Patent: Jan. 6, 1987

[54] SNOWMOBILE

[75] Inventors: Kirk A. Boyer, Lino Lakes, Minn.; Tesuo Imai, Shizuoka, Japan

[73] Assignee: Yamaha Hatsudoki Kabushiki Kaisha, Iwata, Japan

[21] Appl. No.: 812,912

[22] Filed: Dec. 23, 1985

[51] Int. Cl.⁴ .............................................. B62M 27/02
[52] U.S. Cl. .................................. 180/190; 280/21 R
[58] Field of Search ............... 180/184, 190, 191, 192, 180/193; 280/21 R X, 21 A, 16

[56] References Cited

U.S. PATENT DOCUMENTS

| 3,213,955 | 10/1965 | Hetteen | 180/190 |
| 3,712,396 | 1/1973 | Ende | 180/190 |
| 3,719,242 | 3/1973 | Duclo | 180/193 |
| 3,734,221 | 5/1973 | Labelle | 180/190 |
| 3,828,872 | 8/1974 | Tuchiya | 180/190 |

FOREIGN PATENT DOCUMENTS

| 610777 | 12/1960 | Canada | 180/190 |
| 1298357 | 6/1962 | France | 180/190 |

Primary Examiner—John A. Pekar
Attorney, Agent, or Firm—Orrin M. Haugen; Thomas J. Nikolai

[57] ABSTRACT

A small, light-weight snowmobile having a chassis frame assembly comprised of a front frame member supporting a pair of steerable skis and a driver's seat and a rear frame member supporting an engine and a drive track device. The rear frame is swingably connected to the front frame by a parallel link mechanism and the arrangement is such that the driver is situated lower to the ground whereby the feeling of traveling at higher than actual speed is enhanced.

12 Claims, 5 Drawing Figures

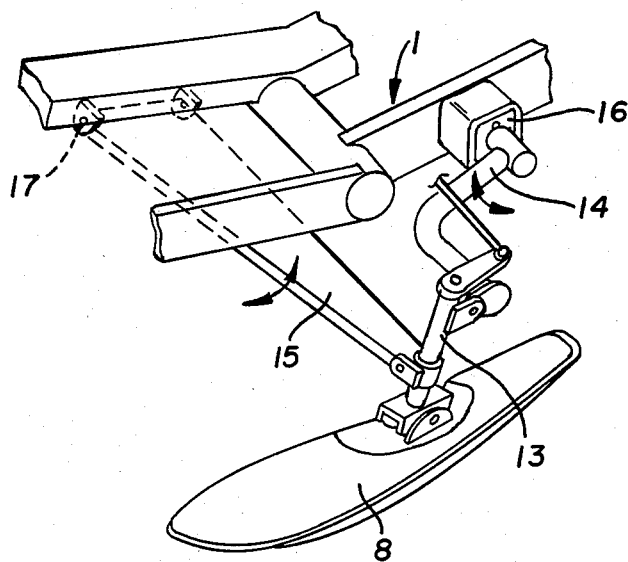
FIG.3
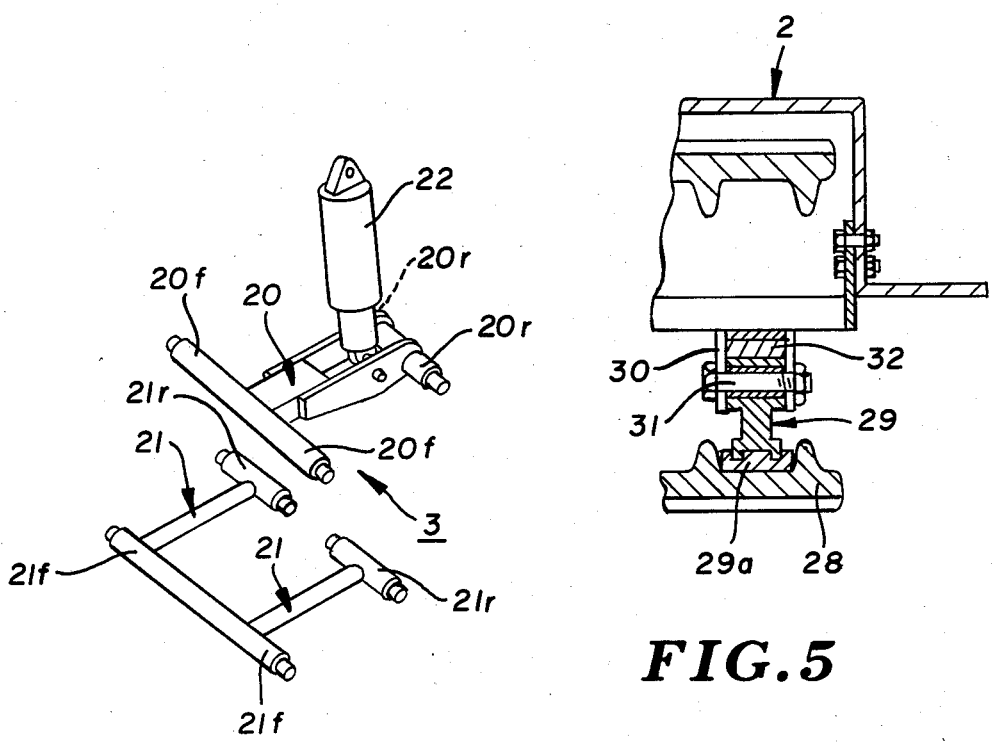
FIG.4
FIG.5

SNOWMOBILE

BACKGROUND OF THE INVENTION

I. Field of the Invention

This invention relates generally to a snowmobile designed to make the driver perceive that it is moving faster than it actually is traveling, and more particularly to a snowmobile which is small in size and lightweight and which makes the driver feel he is traveling at a high speed because he is positioned closer to the ground than in conventional designs.

II. Discussion of the Prior Art

Snowmobiles are generally designed to run at a relatively high speed on roads or over open fields. The conventional snowmobile is normally constructed of an elongated integral frame, a pair of steerable skis disposed below and mounted on the front end of the frame, a drive track positioned below and to the rear end of the frame, an engine disposed beneath a cowl on the front portion of the frame for driving the drive track through a suitable transmission, and a driver's seat installed toward the rear of the frame and above the drive track. Where the snowmobile of the above construction is to be operated in more confined spaces, such as in the backyard of a typical residence, the snowmobile may be reduced in size. Even if the snowmobile were reduced in size, however, it could not be driven in the smaller area at the same high speed as it would be when traversing an open field. Therefore, a conventional snowmobile would fail to make the driver feel as if he is moving fast nor would he experience the same exhilaration.

It is known that a person driving a vehicle will feel he is moving at a faster speed when the position of his eyes is lowered relative to the ground, even though the actual speed of travel of the snowmobile is somewhat reduced. Based upon this knowledge, it has been proposed that the position of the engine, which is normally in front of the driver and which would obstruct the driver's view if his position is lowered, be shifted to the rear of the frame with the drive track being located behind the seat so that the seat may be lowered. (See U.S. Pat. No. 3,828,872.) With the engine disposed on the rear end of the frame, however, the drive track disposed below the frame imposes a serious limitation on the extent to which the position of the driver's seat may be lowered. As a consequence, the prior art snowmobile over which the present invention is an improvement still fails to give the driver the feeling or impression of moving faster than he actually is.

Furthermore, if the stroke or vertical movement of the ski suspension system on the snowmobile is reduced to obviate the limitation imposed by the location of the drive track in an attempt to lower the driver's seat, then the riding comfort of the vehicle will be impaired. For the reasons described above, the snowmobile design reflected in U.S. Pat. No. 3,828,872 has proved somewhat unsatisfactory.

OBJECTS

It is a primary object of the present invention to provide a snowmobile constructed in such a way as to lower the position of the driver's eyes as much as possible to thereby make the driver feel as if he is running relatively fast on the moving snowmobile.

Yet another object of the invention is to provide a snowmobile vehicle having a lower center of gravity than prior art designs which creates a more stable vehicle and increased rider comfort due to the shielding provided by the machine's cowling and fairing.

Another object of the invention is to provide a snowmobile having a reduced height dimension while maintaining an adequate vertical stroke of its shock absorber for providing good riding comfort.

Still another object of the present invention is to provide a snowmobile having a reduced weight while maintaining the frame rigidity at a required level.

SUMMARY OF THE INVENTION

To achieve the above objects, a snowmobile constructed in accordance with the present invention includes a chassis frame assembly composed of a front frame member supporting a pair of steerable skis, a driver's seat and cowl and windshield assembly. The chassis frame assembly also includes a rear frame member supporting an engine and a drive track device, the front and rear frame members being interconnected by a connecting link mechanism, which provides a low-slung disposition of the driver when positioned on the seat. A shock absorber is interposed between the front frame and rear frame members to dampen or suppress jarring of the driver when traversing rough terrain.

The above and other objects, features and advantages of the present invention will become more apparent from the following description when taken in conjunction with the accompanying drawings in which like numerals in the several views refer to corresponding parts.

BRIEF DESCRIPTION OF THE DRAWINGS

FIG. 3 is a fragmentary perspective view of a suspension system for a ski of the snowmobile;

FIG. 4 is an exploded perspective view of a parallel link mechanism for interconnecting front and rear frame members of the snowmobile; and FIG. 5 is an enlarged fragmentary cross-sectional view taken along line V—V of FIG. 1.

DESCRIPTION OF THE PREFERRED EMBODIMENT

Figure 1:
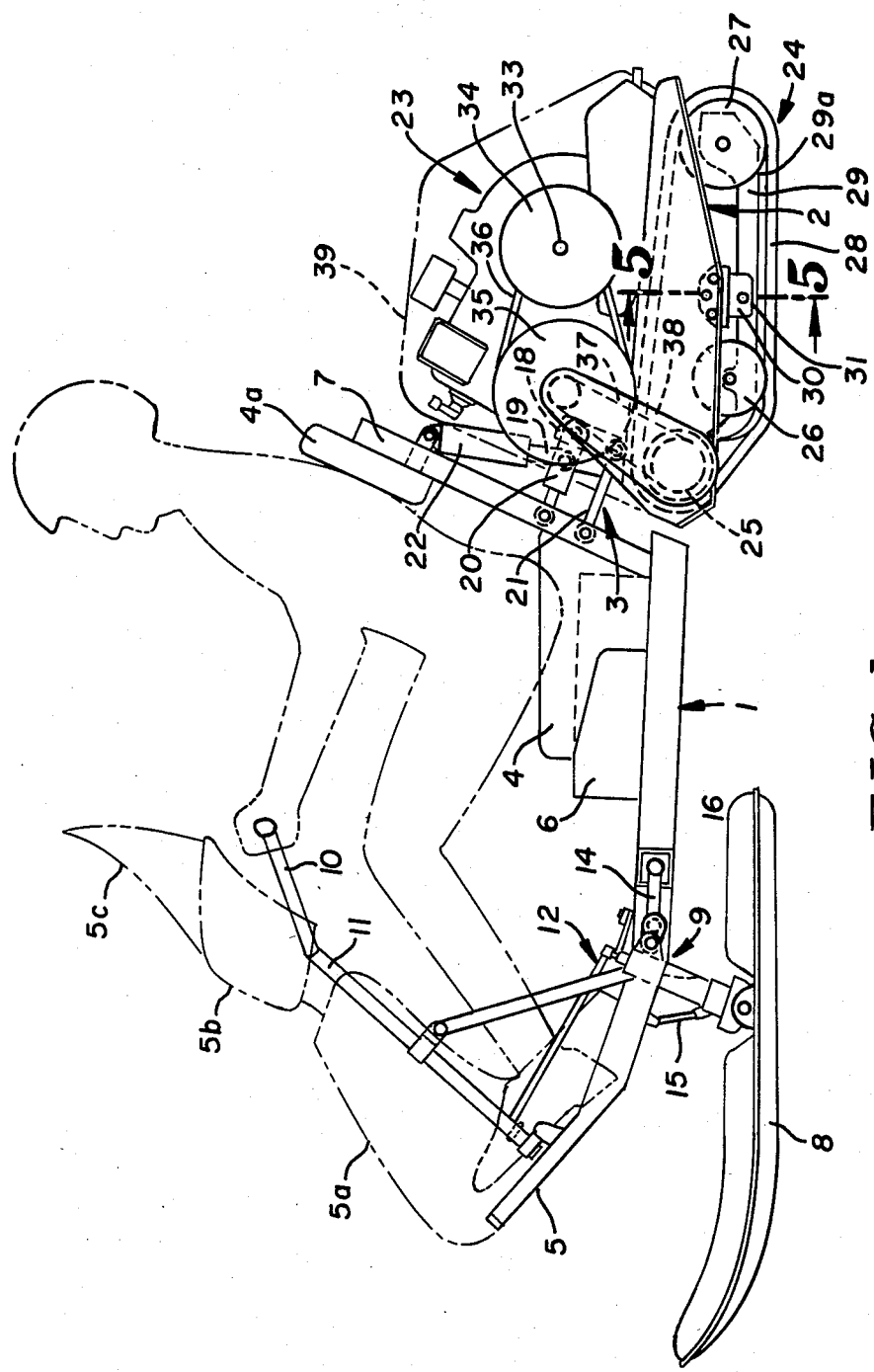
FIG. 1 is a side elevation of a snowmobile according to a preferred embodiment of the present invention.
Figure 2:
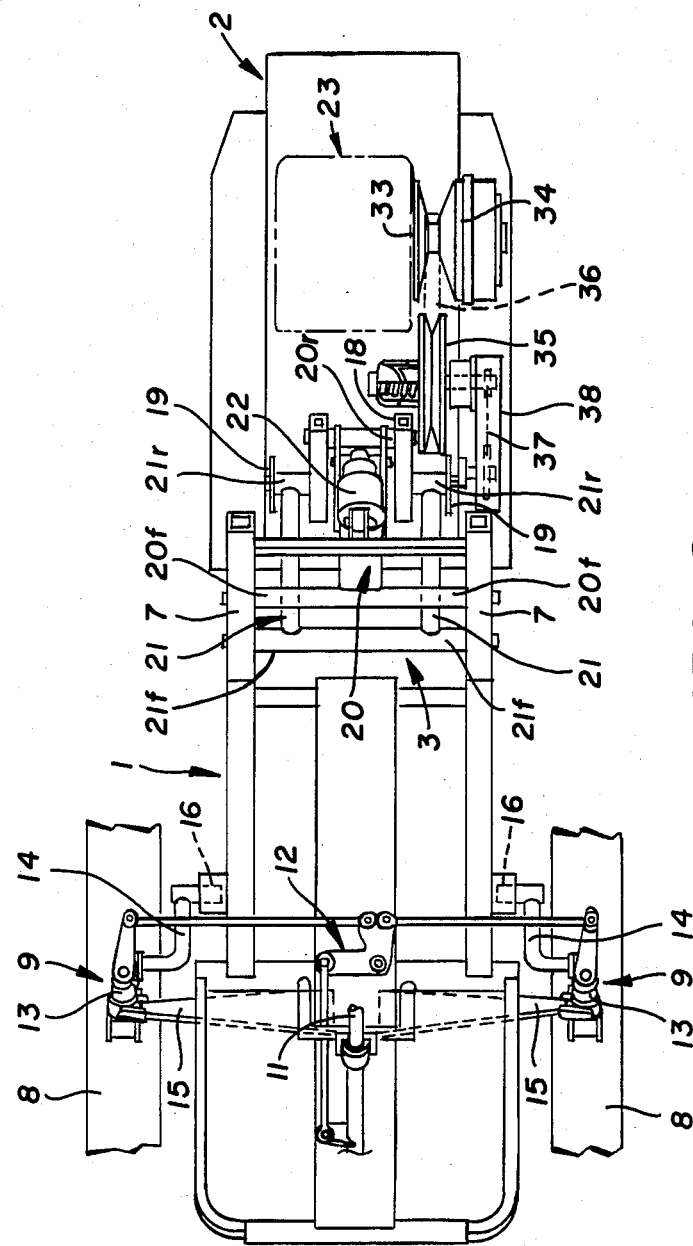
FIG. 2 is a plan view of the snowmobile of the present invention with certain of its upper parts removed for ease of illustration.

As shown in FIGS. 1 and 2, the snowmobile in accordance with the present invention includes a chassis frame assembly comprising a front frame 1 and a rear frame 2 which are independent of one another. A driver's seat 4 is mounted on the upper surface of a rear end of the front frame 1, which has a footrest 5 inclined upwardly toward its front end so that the driver can have his legs comfortably extended. A fuel tank 6 is supported on the front frame 1 and positioned below the driver's seat 4. This arrangement on the front frame 1 provides a large leg-room clearance over the front footrest 5 and behind cowl 5a, fairing 5b and windshield 5c. A pair of back stays 7—7 is mounted vertically on the rear end of the front frame 1 behind the driver's seat 4 and a back rest 4a is attached to the upper ends of the back stays 7—7.

A pair of laterally spaced skis 8—8 is supported from the lower surface of the front end portion of the front frame 1. More specifically, the skis 8—8 are supported from the frame by independent suspension systems 9—9, respectively. The skis 8—8 can be steered by a steering handle 10 through a steering shaft 11 and a steering mechanism 12. As shown in FIG. 3, each of the independent suspension systems 9—9 has two swing arms 14 and 15 which pivotally support a pivot tube 13 supporting one of the skis 8. The swing arm 14 is resiliently supported by a torsion rubber member 16 fixed to one side of the front frame 1. The swing arm 15 is triangular in shape and freely rotatably supported for rotation in a vertical plane by a pivot shaft 17 on the side of the front frame 1. The independent suspension systems 9—9 are simple in structure and can steer the skis 8—8 effectively by the tie rods joining the steering link 12 to the struts (not shown) contained within the pivot sleeves 13.

The rear frame 2 is of a somewhat box-shaped construction having at least an upper wall, a front wall, and a pair of side walls. To the front portion of the upper wall, there are fixed a pair of laterally spaced stays 18—18 and a pair of laterally spaced brackets 19—19. A parallel link mechanism, indicated generally by numeral 3, is coupled between the stays 18—18, the brackets 19—19, and back stays 7—7 on the front frame 1 for swingably interconnecting the front and rear frames 1 and 2 to one another.

As illustrated in FIG. 4, the parallel link mechanism 3 comprises an upper central arm assembly indicated generally by numeral 20 and lower arm assembly 21. The upper arm assembly 20 has laterally spaced front ends 20f—20f pivotally supported on the back stays 7—7 (FIG. 1), respectively, and laterally spaced rear ends 20r—20r pivotally supported on the rear frame stays 18—18, respectively. The lower arm assembly 21 has front ends 21f—21f pivotally supported on the back stays 7—7, respectively, and rear ends 21r—21r pivotally supported on the rear frame stays 18—18 and the brackets 19—19, respectively. While in the drawings, especially FIG. 4, the upper and lower arm assemblies cooperating with the front frame members 7—7 and the rear stays 18—18 tend to define a parallelogram link mechanism, it is not necessary that the individual links comprising these two assemblies be parallel or of equal lengths.

A shock absorber 22 is pivotally interconnected between an intermediate portion of the upper central arm assembly 20 and the back stays 7—7 coupled to the front ends 20f of the central arm. The shock absorber 22 may be of a known structure comprises a hydraulic cylinder and a coil spring. As illustrated, the shock absorber 22 has a lower end pivotally supported on the intermediate portion of the upper arm 20 and an upper arm pivotally supported between the back stays 7—7. The shock absorber 22 allows the rear end of the front frame 1 to be resiliently supported on the front end of the rear frame 2.

An engine 23 is installed on the upper wall of the box-shaped rear frame 2 and is enclosed by a cover 39. An endless drive track 24 is partially housed within the box-shaped rear frame 2 and projects downwardly therefrom. As is shown in FIG. 1, the drive track 24 comprises a pair of laterally spaced front drive wheels 25—25 and a pair of laterally spaced rear idler wheels 27—27. Endless track belts 28 are trained around the drive and idler wheels 25, 26, 27. Each of the track belts 28 has a lower run or flight with its inner surface held against a slide rail 29. The idler wheels 26, 27 are rotatably supported on the front and rear ends of the slide rails 29.

As shown in FIG. 5, each slide rail 29 is swingably supported by a pivot shaft 31 on a bracket 30 fixed to the rear frame 2. The slide rail 29 can be resiliently moved back to a horizontal position by a resilient rubber plate 32 or an equivalent torsional member interposed between the slide rail 29 and the bracket 30 for dampening shocks and vibrations applied to the slide rail 29. A plate 29a of a synthetic resin having a low coefficient of friction or frictional resistance, e.g., nylon, is attached to the lower surface of the slide rail 29 and slidably held against the track belt 28. The swingably supported slide rail 29 permits the track belt 28 to follow irregularities on the snow surface on which the snowmobile runs, thereby enabling the track belt 28 to produce a high traction. It is also contemplated that a bogie-wheel track support system of known design can be used in place of the slide rail system.

The engine 23 has a power output shaft 33 coupled to a known V-belt transmission comprising laterally movable conical sheaves 34, 35 and a V-belt 36 trained therearound. The V-belt transmission automatically changes the speed of transmitted rotation dependent on the speed of rotation of the engine 23 while transmitting the engine power from the sheaves 35 through a chain 37 to the drive wheels 25 of the drive track device 24. The chain 37 is trained around a sprocket fixed coaxially to the shaft of the sheaves 35 and a sprocket fixed to an end of the shaft of the drive wheels 25 which projects out of one of the side walls of the rear frame 2. The chain 37 is covered with a chain case 38 and may comprise a plurality of interconnected links, a toothed belt, a V-belt, or other suitable power transmission mediums trained around associated sprockets or pulleys.

As described above, the chassis frame assembly comprises the front frame 1 and the rear frame 2 which are independent of each other but pivotally joined to one another via the linkage mechanism 3. The skis 8—8 and the driver's seat 4 are mounted on the front frame 1 while the engine 23 and the drive track device 24 are mounted on the rear frame 2. Therefore, unlike most snowmobile designs, no engine is disposed in front of the driver's seat 4, and the driver's view is not hindered by the engine 23 or a cowl used to cover same. Since there is no drive track device positioned directly below the driver's seat 4, the driver's seat 4 can be lowered in position as much as possible to keep the location of the driver's eye low to the ground. As such, when moving, the driver perceives that he is running faster than he really is.

The rear end of the front frame 1 and the front end of the rear frame 2 are interconnected by the parallel link mechanism 3 described earlier as comprising the upper arm assembly 20 and the lower arm assembly 21. While the front end of the rear frame 2 pivots with respect to the front frame 1, the rear frame 2 is translated, without changing its attitude, with respect to the front frame 1. The power unit or engine 23, even when positioned proximate the front portion of the rear frame assembly 2 close to the front frame 1, does not interfere with the back stays 7—7 on the front frame 1. Therefore, a relatively wide space on the front portion of the rear frame 2 can effectively be utilized for accommodating the power unit. Since the front frame 1 is movable in large vertical strokes with respect to the rear frame 2, the driver seated on the front frame 1 is given a good riding comfort and is not subjected to high shock forces when uneven terrain is encountered.

Inasmuch as the skis 8—8 are independently suspended from the respective swing arms 14 supported by the torsion rubber members 16 outboard of the footrests, the footrest space on the front frame 1 is not reduced, which is not the case when a conventional suspension system comprised of hydraulic cylinders and springs projecting upwardly into the footrest area is used. In addition, the fuel tank 6 is positioned below the driver's seat 4 to increase the footrest space for a better riding comfort.

As mentioned above, the link mechanism 3 allows the track belts 28 to follow snow surface irregularities, thereby preventing the drive track device 24 from lifting off the snow surface and enabling the track belts 28 to produce an increased traction. The high traction is further assured by the slide rail 29 slidably held against the inner surface of each track belt 28 and pivotally supported at its center on the rear frame 2. Furthermore, because of the resilient pivoting of the rear suspension provided by the pivot pins 31 and the rubber segments 32, a torque reaction results during acceleration which serves to transfer weight from the skis to the rear frame, thereby improving acceleration and traction of the vehicle.

Since each of the front and rear frames is shorter than a conventional single integral chassis frame, the front and rear frames are subject to reduced bending and twisting moments. Therefore, the front and rear frames may be of a lighter construction than the conventional single integral chassis frame would have to be for the same required rigidity, and the total weight of the front and rear frames can be less than the weight of prior art integral chassis frame.

In conjection with the lower driver's position afforded by the improved design described herein, the overall center of gravity of the machine is lowered, creating a more stable vehicle. The cowl 5a, fairing member 5b and windshield 5c afford improved protection from the elements (wind, snow, cold) than has been attained with known prior art one-man vehicles in that a driver's body and appendages (arms and legs) are effectively shielded. This is to be contrasted with present designs where most of the driver's body is exposed to the elements.

Although a certain preferred embodiment has been shown and described, it should be understood that many changes and modifications may be made therein without departing from the scope of the appended claims.

What is claimed is:

1. A snowmobile comprising:
   (a) a front frame member supporting a pair of steerable skis and a driver's seat;
   (b) a rear frame member supporting an engine and a drive track device drivable by said engine; and
   (c) a link mechanism having an upper arm assembly and a lower arm assembly, each pivotally coupled between the rear end of said front frame member and the front end of said rear frame member.

2. A snowmobile according to claim 1, wherein said rear frame member is of a box-like construction comprising at least an upper wall, a front wall, and a pair of side walls, said drive track device being housed in said box-like construction, said engine being fixed to an upper surface of said upper wall and a shock absorber disposed between said rear frame member and said rear end of said front frame member.

3. A snowmobile according to claim 2 wherein said shock absorber has a lower end thereof pivotally coupled to said upper arm assembly and an upper end pivotally coupled to said rear end of said front frame member.

4. A snowmobile according to claim 2 wherein said rear frame member has a pair of laterally spaced stays affixed to a front portion of said upper wall with said drive track device being swingably supported at said laterally spaced stays.

5. A snowmobile according to claim 1, wherein said drive track device comprises drive wheels operatively coupled to said engine, idler wheels, track belts trained around said drive and idler wheels, and slide rails slidably held against inner surfaces of said track belts, said slide rails being pivotally supported on said rear frame member.

6. A snowmobile according to claim 5, wherein said slide rails are pivotally supported on said rear frame member through resilient or torsional members to dampen shocks and vibrations applied to the slide rails.

7. A snowmobile according to claim 6 wherein weight is transferred from said skis to said rear frame member upon acceleration of said track belt.

8. A snowmobile according to claim 1, wherein said skis are independently suspended on said front frame member.

9. A snowmobile according to claim 1 and further including swing arms resiliently supported by torsion rubber members on said front frame member, said skis being supported by said swing arms.

10. A snowmobile according to claim 1 and further including a fuel tank disposed below said driver's seat on said front frame member.

11. A snowmobile according to claim 1 wherein said driver's seat comprises a generally horizontal seat portion and a rearwardly and upwardly sloping backrest portion.

12. The snowmobile as in claim 11 and further including a cover surrounding said engine, the front side surface of said cover being generally parallel to said rearwardly sloping backrest portion.

* * * * *

UNITED STATES PATENT AND TRADEMARK OFFICE
CERTIFICATE OF CORRECTION

PATENT NO.  : 4,633,964

DATED       : January 6, 1987

INVENTOR(S) : Kirk A. Boyer, et al

It is certified that error appears in the above-identified patent and that said Letters Patent is hereby corrected as shown below:

Column 6, Line 54, before sloping insert -- and upwardly --.

Signed and Sealed this

Tenth Day of March, 1987

Attest:

DONALD J. QUIGG

Attesting Officer

Commissioner of Patents and Trademarks